United States Patent [19]

Kojima et al.

[11] Patent Number: 5,037,058
[45] Date of Patent: Aug. 6, 1991

[54] DAMPER UNIT FOR AUTOMOTIVE POWER UNIT OR THE LIKE

[75] Inventors: Masamitsu Kojima; Masami Mochimaru; Ikuo Shimoda; Masaru Iwakura, all of Fujisawa; Takanobu Ide, Isehara, all of Japan

[73] Assignees: Nissan Motor Co., Ltd.; Oiles Corporation, both of Japan

[21] Appl. No.: 444,699

[22] Filed: Dec. 1, 1989

[30] Foreign Application Priority Data

Mar. 29, 1989 [JP] Japan .................................. 1-78940

[51] Int. Cl.⁵ .......................................... F16M 13/00
[52] U.S. Cl. .................................... 248/562; 180/300
[58] Field of Search ................ 248/562, 567; 188/290, 188/306; 180/300

[56] References Cited

U.S. PATENT DOCUMENTS

| | | | |
|---|---|---|---|
| 1,170,758 | 2/1916 | Kilgour | 188/306 X |
| 1,341,395 | 5/1920 | Sutton | 188/306 X |
| 1,522,380 | 1/1925 | Morsch . | |
| 1,701,828 | 2/1929 | Steinem | 188/306 X |
| 1,807,945 | 6/1931 | Trumble | 188/306 |
| 1,817,675 | 8/1931 | Chapin | 188/306 X |
| 1,856,325 | 5/1932 | Flentje . | |
| 1,943,547 | 1/1934 | Paton | 188/306 X |
| 1,945,512 | 2/1934 | Bijur | 188/306 X |
| 2,094,304 | 9/1937 | Salenius | 188/366 |
| 2,243,713 | 5/1941 | Maruhn . | |
| 3,295,639 | 1/1967 | Smith | 188/290 |
| 4,503,952 | 3/1988 | Hesse . | |

FOREIGN PATENT DOCUMENTS

| | | | |
|---|---|---|---|
| 3723239 | 2/1989 | Fed. Rep. of Germany | 188/306 |
| 2173441 | 2/1972 | France . | |
| 63-14036 | 1/1988 | Japan . | |

*Primary Examiner*—David L. Talbott
*Attorney, Agent, or Firm*—Leydig, Voit & Mayer

[57] ABSTRACT

A damper used to damp roll vibration of an automotive power unit includes housing in which a disc is immersed in a highly viscous liquid, and a linkage which has universal joints formed at each end thereof. The linkage induces relative rotation between the housing and the disc. A resilient vibration attenuating arrangement is included in one or both of the universal joints for insulating the vehicle chassis from vibration which tends to be freely transmitted through the damper per se and cause cabin reverberation noise.

14 Claims, 11 Drawing Sheets

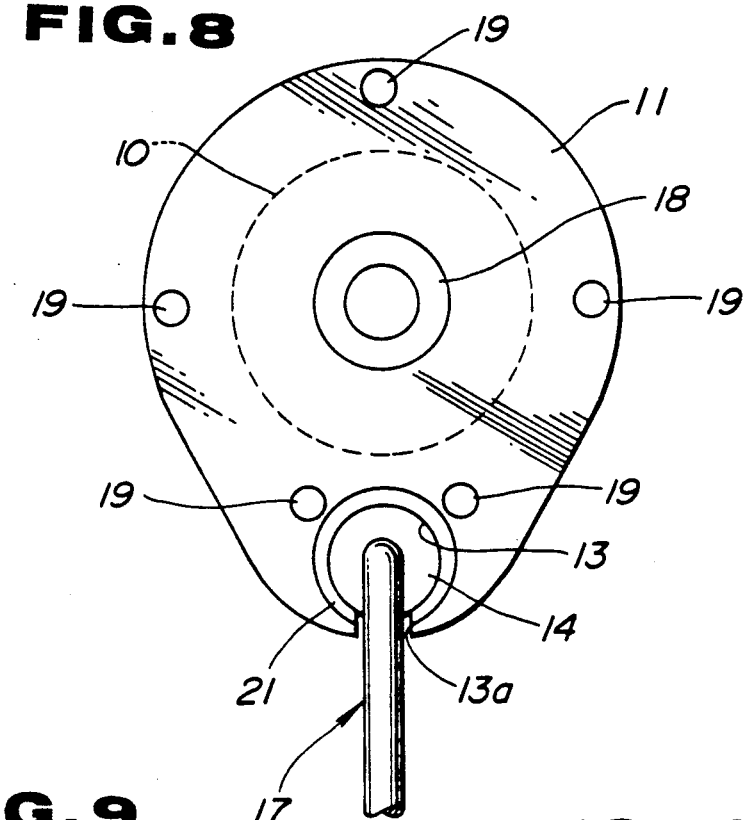
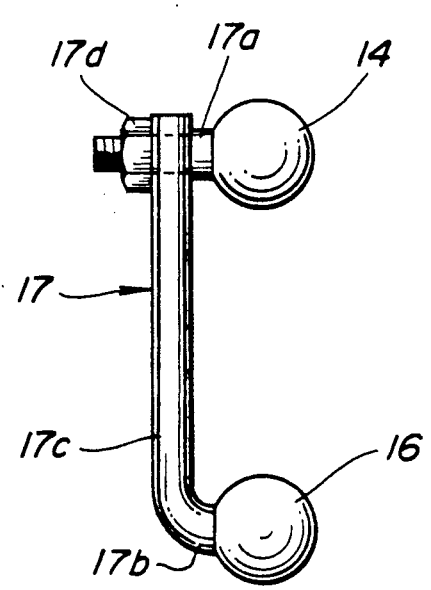
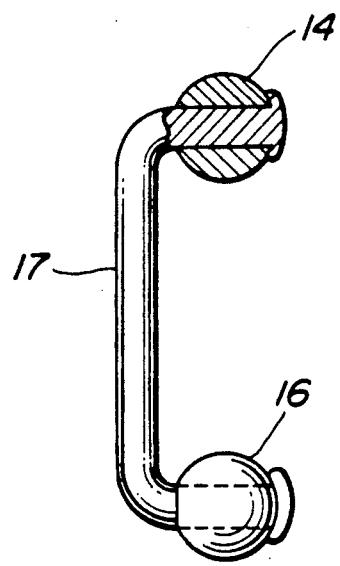

5,037,058

DAMPER UNIT FOR AUTOMOTIVE POWER UNIT OR THE LIKE

BACKGROUND OF THE INVENTION

1. Field of the Invention

The present invention relates generally to a damper for supporting a power unit (a combination of an engine and transmission) and more particularly to a damper arrangement which attenuates roll vibration using viscous shearing resistance.

2. Description of the Prior Art

JP-A-63 14036 discloses a damping arrangement wherein a circular plate or disc is mounted on a shaft or similar member which is rigidly connected with the power unit. The plate is disposed in a circular housing or casing in a manner to be immersed in a viscous fluid. The casing is connected to the vehicle chassis by way of a linkage which induces relative rotation between circular disc and the circular housing.

However, this arrangement suffer from the drawback that the power unit is supported on the chassis by elastomeric members in a manner to be simultaneously movable in a plurality of directions, since the power unit does not just move in the role direction but tends to move randomly in different directions in addition to the roll one. Accordingly, the actual device is required to include a linkage which has:

1. a connecting member which is made of flexible plate and which acts a spring link; or
2. at least one elastomeric bush between the casing and the chassis; or
3. a combination of a flexible link and elastomeric bushes.

In the case a spring link is used, when the spring link is subject to tractive forces, there is no problem, but, when the link is subject to compressive forces, the link tends to flex and thus reduce the relative rotation between the housing and the disc. This of course reduces the effectiveness of the damper. In the case wherein one or more elastomeric bushes are used, when rolling motion of the engine occurs, the bushes distort in a manner which reduces the amount of relative rotation which is produced between the disc and the housing and thus again the damper is not used to its full potential.

A combination of elastomeric bushes and a flexible connector increases the problem and markedly reduces the amount of relative rotation which is induced.

SUMMARY OF THE INVENTION

It is an object of the present invention to provide an arrangement which enables the maximum amount of relative rotation to be produced between a disc and a housing in a viscous shear type damper device.

It is a further object of the present invention to provide a damper of the above mentioned type which also attenuates annoying noise causing vibrations which tend to be transmitted through the damper from the power unit to the vehicle chassis.

In brief, the above object is achieved by an arrangement which features a disc which is immersed in a highly viscous liquid, and a linkage which has universal joints formed at each end thereof. The linkage induces relative rotation between the housing and the disc. A resilient vibration attenuating arrangement is included in one or both of the universal joints for insulating the vehicle chassis from vibration which tends to be freely transmitted through the damper per se and cause cabin reverberation noise. This arrangement does not reduce the amount of relative rotation between the disc and the housing in which it is disposed.

More specifically, the present invention is deemed to comprise a vibration damper which features: a housing, said housing including a chamber, said chamber being filled with a viscous fluid, said housing being connected to a first structure; a disc, said disc being disposed in said chamber in manner to be immersed in said viscous liquid and to be movable relative to said housing; a rigid link, said link extending between said housing and a second structure, a first universal joint, said first universal joint operatively interconnecting a first end of said link with said housing; a second universal joint, said second universal joint being arranged to connect a second end of said link to a second structure; and vibration insulation means associated with one of said first and second universal joints for attenuating vibration which tends to be transmitted between the first and second structures without inducing relative movement between said disc and said housing.

BRIEF DESCRIPTION OF THE DRAWINGS

FIG. 8 is a front elevation showing a fourth embodiment of the present invention which features the provision of a ball seat which cooperates with one of the balls formed on the connection linkage;

FIGS. 9 and 10 are elevations showing various constructional variations of the connection linkage;

DETAILED DESCRIPTION OF THE PREFERRED EMBODIMENTS

Figure 3:
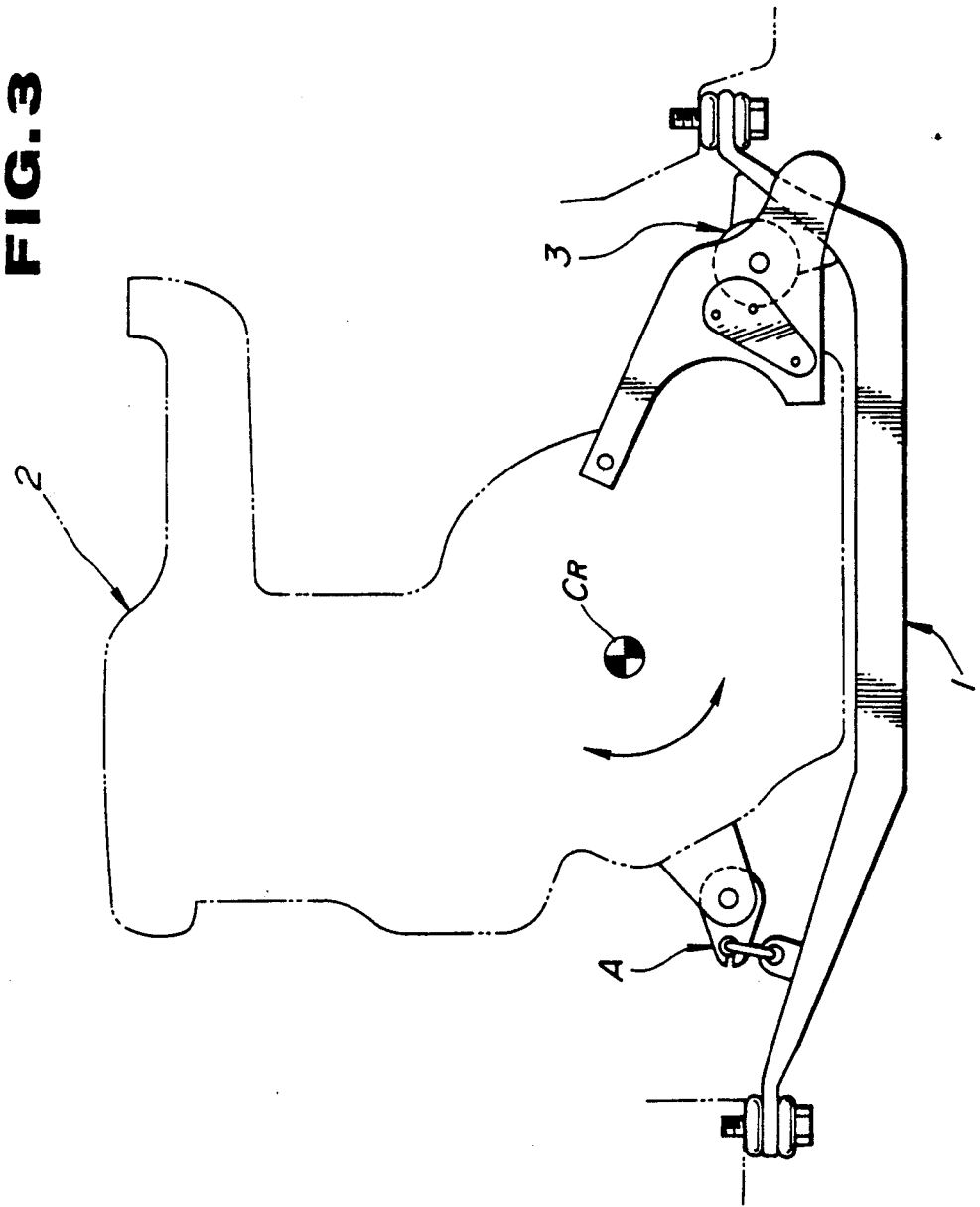
FIG. 3 is a front elevation showing the disposition of a damper according to the present invention used to mount an engine and transmission (a so-called power unit) on a vehicle chassis member.

FIG. 3 shows a power unit damper A according to the present invention operatively connected between a power unit (viz. an engine and transaxle combination) and a vehicle chassis. As shown, the damper is connected between a center member 1 which is connected with the vehicle chassis via elastomeric bushes (no numeral) and a power unit 2 and disposed with respect to the center about which the power unit tends to roll (see curved double ended arrow). The power unit 2 is further operatively connected with a power unit mount 3 in a manner to support the power unit in the illustrated manner. It will be understood that other bushes and mounting device are used to support the engine. However, for the sake of illustrative clarity these elements have been omitted.

Figure 1:
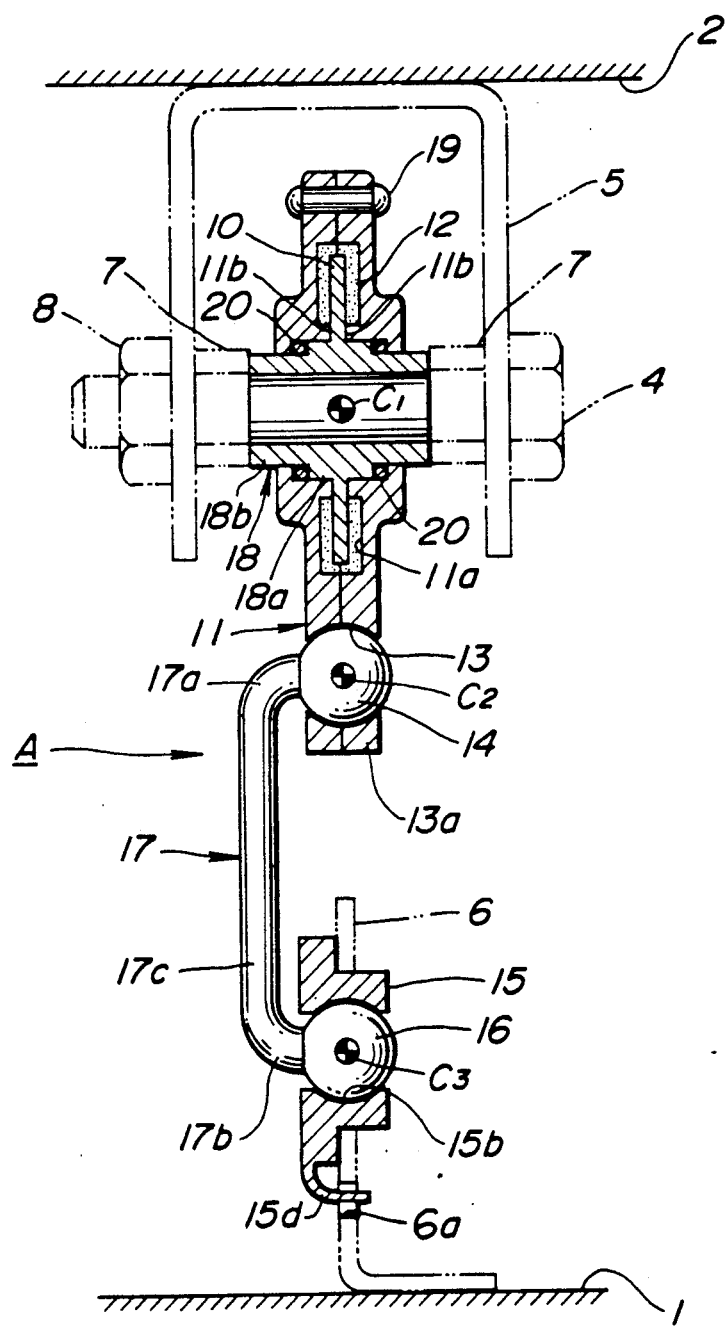
FIGS. 1 and 2 are front (sectional) and side elevations showing an embodiment of the present invention.
Figure 2:
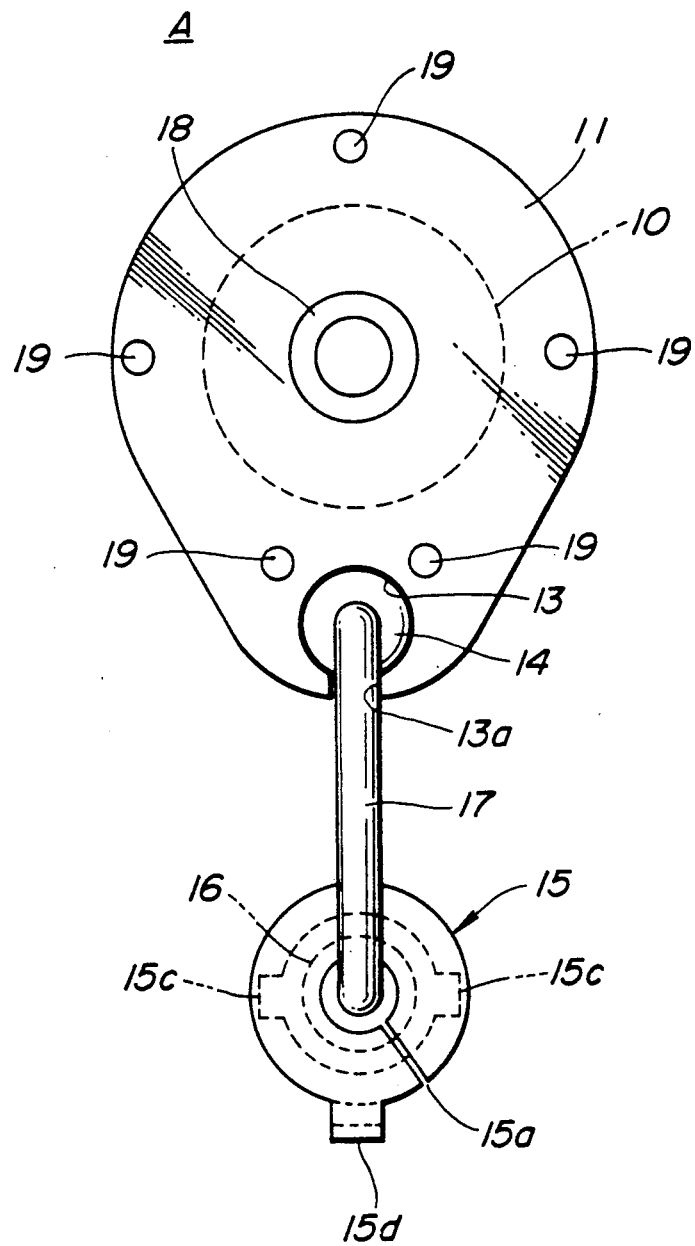

FIGS. 1 and 2 show the construction of the damper A in detail. As will be noted in this embodiment the main body of the damper is supported on a bolt 4 which is detachably connected to a bracket 5 connected to the power unit 2.

An annular disc 10 is disposed within casing 11 which is so constructed and arranged as to define an annular chamber 11a. This chamber is filled with a highly viscous silicon oil 12. The lower portion of the housing is formed with a ball seat 13 in which a spherical ball 14 is received. This ball 14 forms part of a link 17 which extends between the housing 11 and the center member 1. As best seen in FIG. 1, the lower end of the link 17 is formed with a second spherical ball member 16 which is received in a second ball seat 15b which is defined in connector 15.

In this embodiment the connector 15 is formed of a rigid synthetic resin (e.g. Actetal) having first and second essentially cylindrical portions. The smaller diameter of the two portions is disposed in an aperture formed in a bracket 6 which is, in this case, secured to the center member 1. The connector is also formed with first, second and third finger-like members 15c, 15c and 15d which to project through appropriately located apertures formed in the bracket 6 and/or engage suitable edge portions thereof in a manner which secures the connector 15 in place and prevents relative rotation with respect to the bracket 6.

A radially extending slit 15a extends from the outer periphery to the inner one. This slit permits sufficient flexibility to permit the ball member to be forced into the second ball seat 15b. When the connector 15 is mounted on the bracket 6, the connection which is established by the fingers prevents any flexure which may permit the slit to widen and allow the ball 16 to escape.

In this Figure C1, C2 and C3 respectively denote the center of motion of the damper, the upper ball 14 of the link 17 and the lower ball 16 of the same. Cr denotes the center of motion of the power unit 2. As will be appreciated in the normal or home position of the arrangement the three centers align with one another.

In this embodiment the annular disc 10 is formed integrally with a stepped central boss portion 18. This plate and boss portion can be formed of aluminium, carbon steel, stainless steel or any suitable alloy. However, the material is not limited to these and any other suitable material can be used.

The link 17 and the first and second ball members 14, 16 can be formed of aluminium, carbon steel, stainless steel, a suitable alloy or the like. In the first embodiment these elements are formed as a single integral unit.

The disc 10 is arranged to extend from a large diameter portion 18a of the boss, while the steps defined between the large and small diameter portions receive O-ring seals 20. The first and second halves of the housing 11 are secured together by rivets 19 and arranged to cooperate with the large and small diameter portions of the boss to enclose the O-ring seals in the illustrated manner. These halves are also formed with annular flanges 11b which extend parallel to the periphery of the large diameter portion 18a and toward the surfaces of the disc 10. These flanges terminate at locations which are proximate the disc and thus enclose the silicon oil 12 in the annular chamber 11a.

As the bearing surfaces 13 which define the ball seat are formed integrally in the members which define the casing 11, they preferably exhibit good heat resistance, sliding resistance and adequate mechanical strength. By way of example only, polyacetals may be used to form the same.

The casing is formed with a slit 13a which has a width which is essentially the same as or slightly larger than the diameter of the center portion 17c of the link 17. The casing further has an essentially inverted pear shape.

Figure 5:
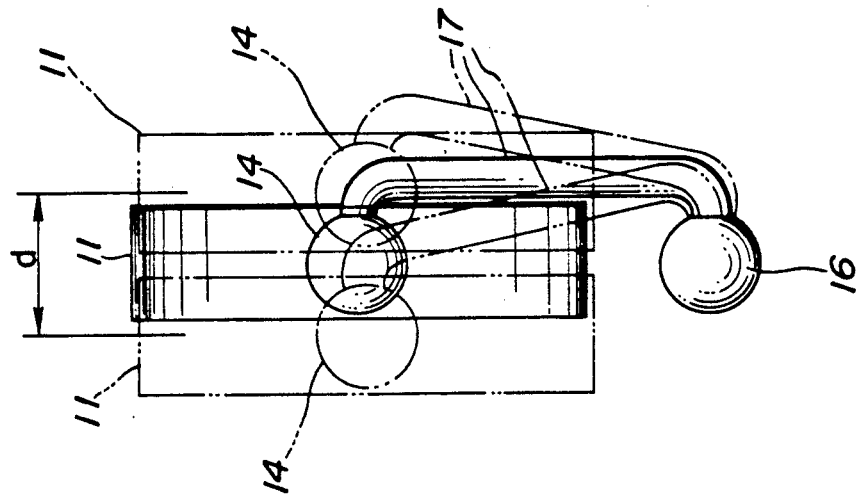
FIGS. 4 and 5 are elevations which show the freedom of movement permitted the damper unit in response to various motions of the engine.
Figure 4:
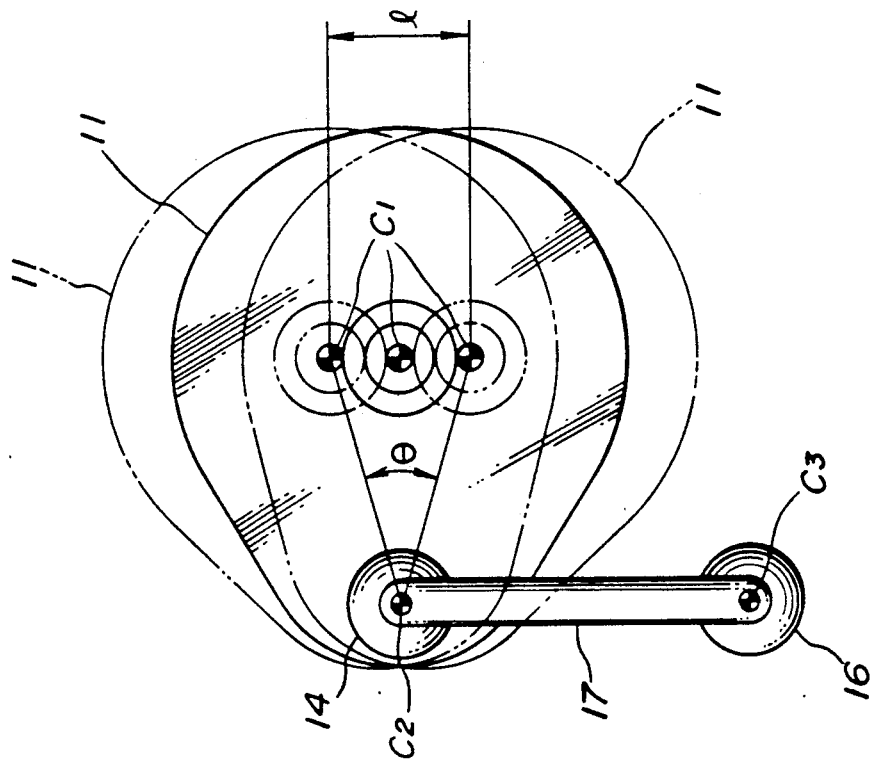

The above construction is such that depending on the direction in which the center of motion Cr of the engine moves, the relative movement shown in FIGS. 4 and 5 is rendered possible.

The operation of the above described device is such that, in the case that the power unit undergoes roll vibration in the direction indicated by the arrow in FIG. 3, the motion depicted in FIG. 4 is produced. Viz., under these circumstances, center C3 remains in place while center C1 is displaced through a distance 1. As a result the link 17 remains essentially stationary and the relative movement between centers C1 and C2 is such as to induce the disc to rotate through an angle $\phi$ with respect to the casing 11. Accordingly, the maximum relative movement between the disc 10 and housing 11 whereby the movement of the disc through the viscous fluid 12 attenuates the rolling reduces the amount of vibration transmitted to the center member 1.

However, as will be appreciated, there will be essentially no time when only the above-described rolling vibration alone occurs. Viz., the power unit will tend to vibrate in a random number of directions simultaneously.

However, with the construction according to the first embodiment, the movement shown in FIG. 5 is also rendered possible. Accordingly, even though center C2 is displaced laterally with respect to center C3 in a manner which brings C3 center out of alignment with C1 and C2, essentially no effective reduction in the relative rotation between the disc 10 and the casing 11 occurs and therefore the loss of roll damping experienced with the earlier discussed prior art is not experienced.

With the first embodiment of the invention the following effects are achieved.

Firstly, as the link 17 is formed of a rigid inflexible material and the universal type joints provided at each end thereof permit random displacement between the power unit 2 and the center member, 1 the loss of roll damping depending on the direction in which the displacement occurs is obviated.

As the ball 14 is seated in the ball seat provided in the casing 11 in a manner wherein there is essentially no relative displacement therebetween, it is not necessary to provide special ball seat members. This simplifies the construction and lowers the cost of the device. Space is further conserved and adequate structural strength provided to handle the forces transmitted between the power unit and the center member.

The material of which the ball seat surfaces 13 are formed is selected so that the sliding resistance and friction which between the seat surfaces and the surfaces of the metallic spherical ball 14 is low and therefore tends to minimize frictional resistance.

The centers C1, C2 and Cr are not subject to displacement relative to one another so no moments are applied to the casing 11 and the longevity of the same is assured.

As the rotating parts of the device are not subject to twisting forces even under high roll vibration, the maximum roll damping effect is realized. Further, the absence of twisting forces prolongs the life of the O-rings and therefore assures that the device exhibits a long working life free of leakage and the like.

The balls 14, 16 and and shaft which constitute the link 17 can be readily and economically formed of aluminium or similar rigid material.

The disc 10 and center boss member 18 can be formed integrally in a manner which assures a permanent connection between the two parts, the chances of breakage are minimized along with an inherent compact configuration.

The stepped configuration of the center boss portion 18 permits the O-rings to be disposed in locations which resiliently support the rotating element within the casing in a manner wherein friction between casing and the rotating elements tends to be minimized.

Even when the centers C1, C2 and Cr are moved out of alignment with center C3 the arrangement of the bracket 6 is prevented from being subject to twisting and bending forces.

As the connector 15 is formed with the slit 15a is easy to snap the connector onto the ball 16 and then insert the same into the aperture formed in the bracket 6 and guide the finger like members 15c and 15d into place. Upon insertion into the bracket 6 expansion of the connector 15 in a manner which permits the ball 16 to come of engagement with the ball seat surfaces 15d is prevented.

Figure 6:
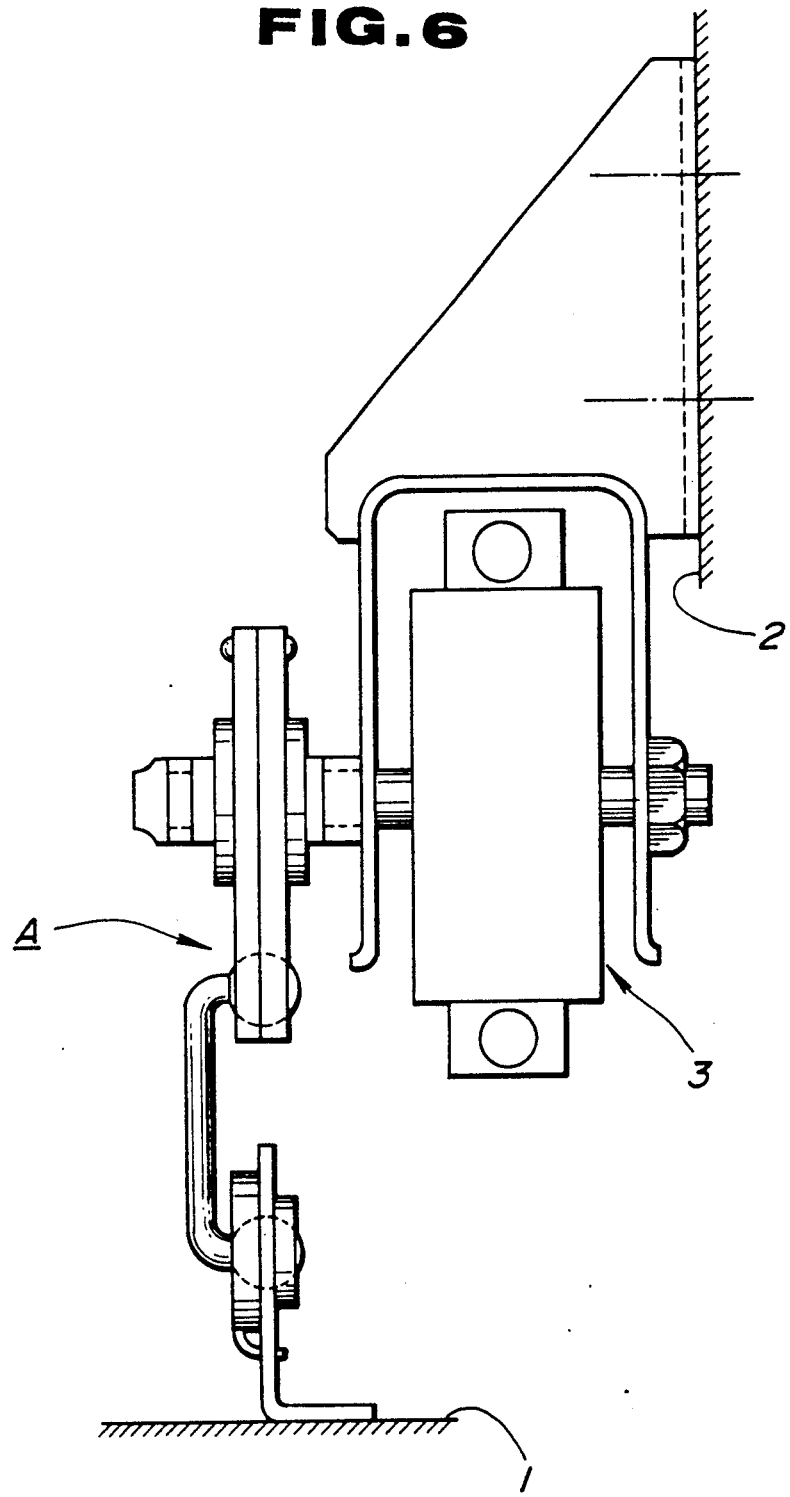
FIG. 6 is an elevation showing a second embodiment wherein a damper according to the present invention is used in combination with an elastomeric bush.

FIG. 6 shows a second embodiment of the present invention. In this arrangement the roll damper A is combined with the power unit mount 3 rather than being located at a separate site. In this arrangement the mount 3 is fixed to a suitable chassis member not shown.

Figure 7:
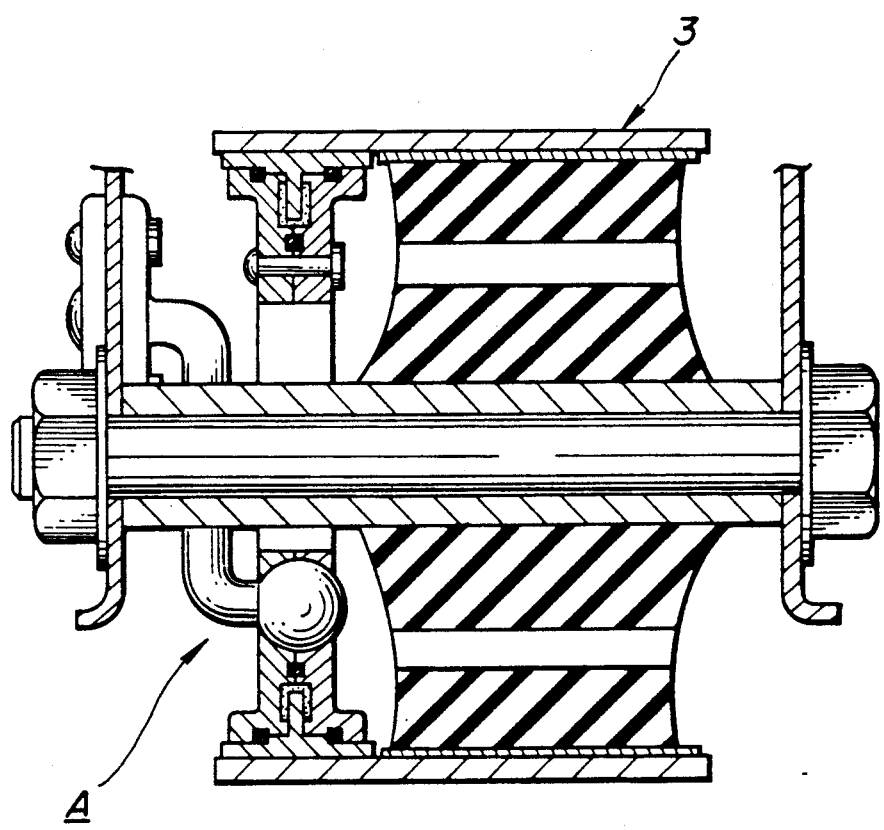
FIG. 7 a sectional view showing a third embodiment of the present invention.

FIG. 7 shows a third embodiment of the present invention. In this arrangement the connection arrangement between the inner and outer members of the engine mount. This disc in this case is connected to the inner periphery of the tubular member which houses an elastomeric bush. O-rings provide a seal between the member on which the disc is formed and the two halves of the casing member. The center of the casing is formed with a relative large diameter opening through which the central shaft of the bush is arranged to extend.

FIG. 8 shows a fourth embodiment of the present invention. In this arrangement a ball seat member 14 is additionally provided. This ball seat can be constructed and arranged in a manner disclosed hereinlater with reference to FIGS. 16 to 20.

FIGS. 9 and 10 show alternative link constructions. As will be appreciated, the arrangement shown in FIG. 9 is such that the upper ball 14 is detachably connected to the link 17. In the case of the arrangement shown in FIG. 10, the ends of a shaft which defines the main body of the link, are bent parallel and the balls rotatably disposed on the parallel portions. The ends of the shaft are formed with ball retaining heads such by a riveting type technique.

Figure 11:
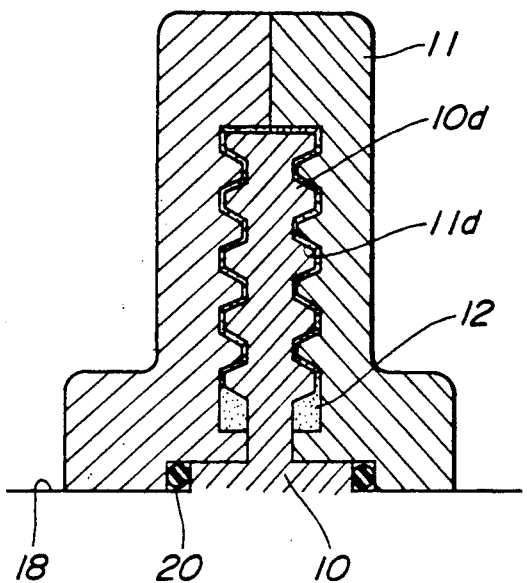
FIGS. 11 and 12 are views showing the construction which characterizes a fifth embodiment of the present invention.
Figure 12:
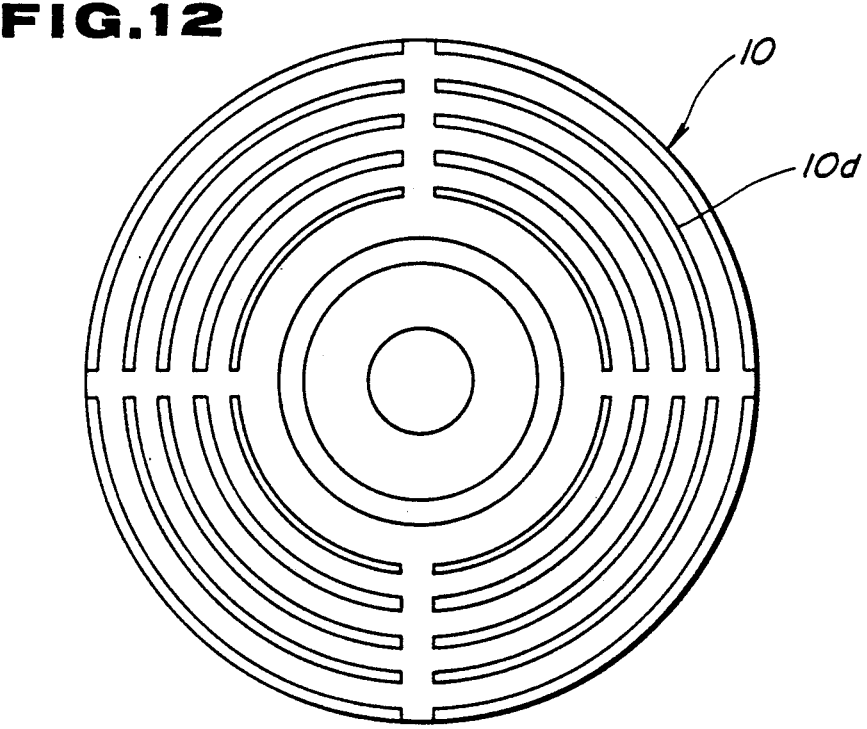

FIGS. 11 and 12 show a construction which characterizes a fifth embodiment of the present invention. As will be appreciated from the drawings, the disc 10 is formed with a plurality of arcuate ribs 10d while the inner surface of the casing halves are formed with correspondingly shaped corrugations 11d. This arrangement increases the surface area which is subject to viscous drag and increases the attenuation of roll vibration. The ribs 10d can be formed continuously to define circular ribs if so desired.

Figure 13:
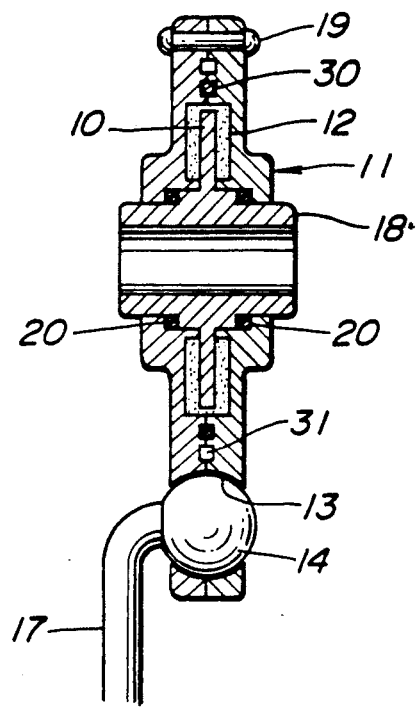
FIG. 13 is a sectional elevation showing a construction which characterizes a sixth embodiment of the present invention.

FIG. 13 shows a sixth embodiment of the present invention. In this arrangement the two halves of the casing 11 are further formed with annular grooves 30, 31 in which seals can be disposed. In the illustrated embodiment only a single seal is disposed in groove 30 in a manner which prevents the leakage of the viscous liquid from the device by way of the interface defined between the two casing halves. If so desired the outer groove 31 can be left empty and used to collect any leakage that may occur with the passing of time.

Figure 14:
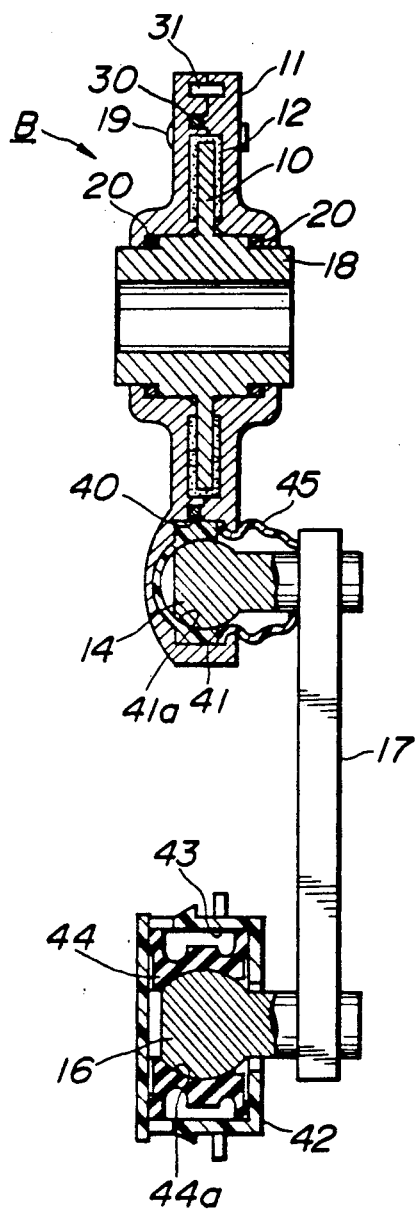
FIGS. 14 and 15 show a seventh embodiment of the present invention.
Figure 15:
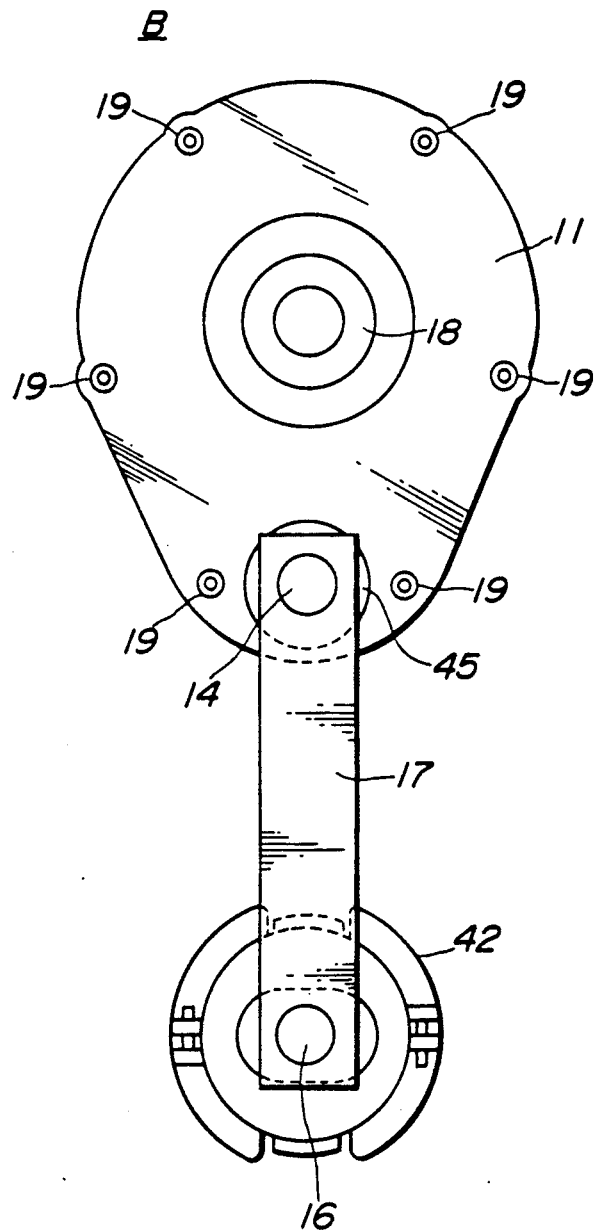

FIGS. 14 and 15 show a seventh embodiment of the present invention. This embodiment features modified ball seat arrangements one of which is designed to attenuate vibrations of the nature which tend to cause reverberation noise in the vehicle cabin. In this arrangement the outboard ball joint features an essentially cylindrical shaped recess 40 which is formed in the casing 11 and a first elastomeric ball seat member 41 which is arranged to snugly fit into the recess. This ball seat 41 is formed with a spherical inner surface 41a which engaged the outboard ball 14 of the link and thus define a first universal joint.

A rubber boot 45 is disposed about the outboard end of the link and arranged so that one end thereof is snugly received in the cylindrical shaped recess 40. The boot extends about the shaft portion on which the ball 14 is formed and thus excludes dust from the joint.

Figure 16:
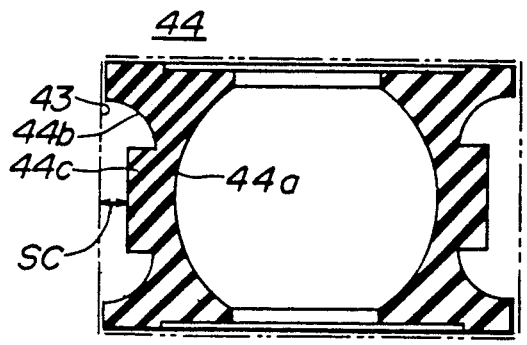
FIG. 16 is a cross-section of an elastomeric member which forms a part of one of the universal joints and which assists in attenuating vibrations which don't induce relative rotation between the disc and housing of the roll damper.

The ball 16 formed on the inboard end of the link 17 is received in an elastomeric ball seat member 44 which is retained in a joint cover 42 fixed to the vehicle chassis or a member which is rigid therewith. In this embodiment the elastomeric member is arranged formed with a spherical inner surface 44a which engages the inboard ball 16 and a shaped external surface which is arranged to engage the inner surface 43 of the joint cover 42. The outer surface of the ball seat member has a radially extending projection which extends about the periphery thereof. As best seen in FIG. 16 this projection is defined in the middle of a concavity and is dimensioned to that the member ~44 must be distorted through a distance or clearance SC (in this case 0.5mm~ 1.5mm) before the projection engages the inner surface of the joint cover.

As will be appreciated until the projection or stopper 44c engages the inner surface of the joint cover 42, the elastomer from which the ball seat member 44 is formed primarily undergoes shear and thus offers relative little resistance to the distorting force (viz., is soft). However, after the projection engages the inner wall, the shearing action is by and large replaced with compression and the resistance to distorting forces increases. After the projections are compressed the resistance to distortion increases rapidly.

The operation of this embodiment is such during engine idling the very low frequency vibrations which are produced tend to effect the silicon oil 12 in a manner wherein the viscosity thereof increases. As a result, this vibration tends to be transmitted from the power unit to the vehicle chassis and result in the generation of reverberation noise in the vehicle cabin.

Figure 21:
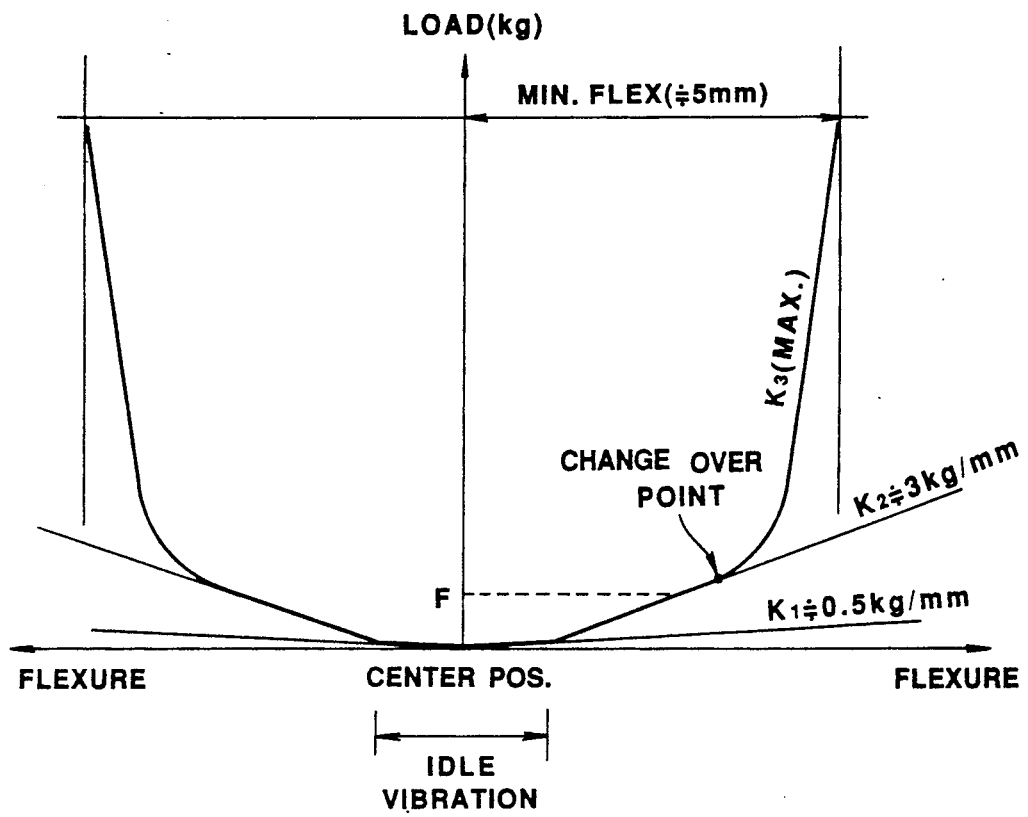
FIG. 21, is a graph showing, in terms of load and flexure, the changes in spring constant which occur with the elastomeric member shown in FIG. 17.
Figure 22:
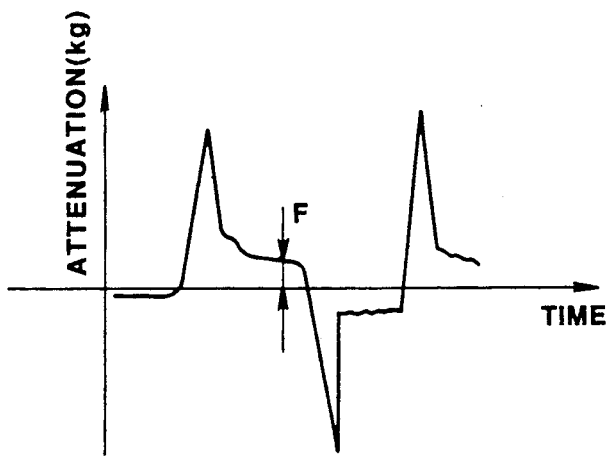
FIG. 22 is a graph showing the force required to induce a change in spring constant of the member shown in FIG. 17.

However, with the instant embodiment, the second or inboard ball joint arrangement is such that, as shown in FIG. 21, in the idling range the initial spring constant k1 of the elastomeric ball seat member 44 is very small (k1 ≈ 0.5Kg/mm). When the projection 44c reaches and engages with the inner wall of the joint cover 42 the spring constant increases to a second low level k2 (e.g. k2 ≈ 3Kg/mm) which is suited to preventing the transmission of reverberation noise causing vibration which tends to be produced during vehicle acceleration. Viz., as shown in FIG. 22 when the force which is applied to the inboard ball joint exceeds F, the stopper clearance SC disappears and the spring constant increases from k1 to k2. This latter mentioned spring constant k2 is maintained until the end of the zone in which acceleration related reverberation tends to be produced.

Following the full compression of the projection 44c, the spring constant rapidly increases from the change over point, to a very high level. In this instant arrangement this tends to occur in response to large distortions in the order of 5mm. In this embodiment the maximum amount of permissible distortion is set at 5mm.

When the power unit produces roll vibration (viz., the power unit exhibits a large relative displacement with respect the vehicle chassis) the elastomeric ball seat member 44 is distorted to the maximum permissible amount and the spring constant of the ball seat member 44 assumes a very high level. As a result the second ball joint exhibits an extremely small amount of play and very little loss in the roll vibration attenuating characteristics of the damper unit are observed.

Figure 17:
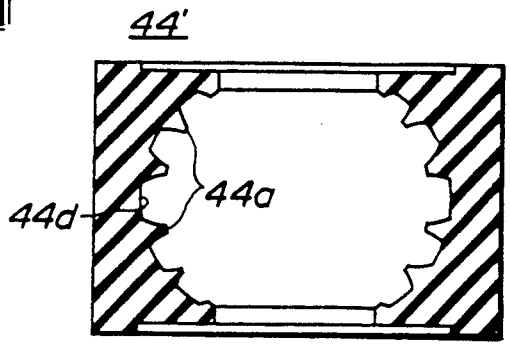
FIGS. 17 to 20 show alternative elastomeric members which can be used in the universal joints in lieu of the one shown in FIG. 16.

Of course the present invention is not limited to the arrangement shown in FIG. 16 and the arrangement illustrated in FIG. 17 can be alternatively used. The FIG. 17 arrangement is such that the spherical surface 44a can be formed with a plurality of recesses 44d. This arrangement reduces the amount of surface area in contact with the ball and thus reduces the amount of friction therebetween.

Figure 18:
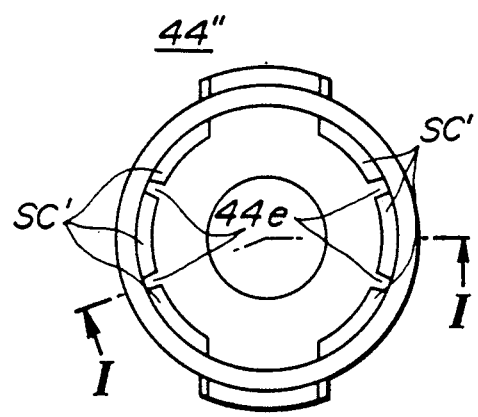
Figure 20:
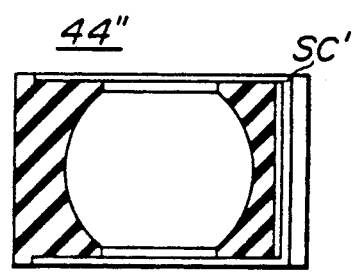
Figure 19:
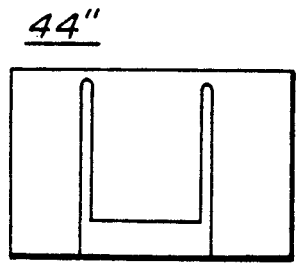

Alternatively, as shown in FIGS. 18 to 20 it is possible to arranged for a number of finger-like projections 44e to extend through the stopper clearance at predetermined intervals and engage the inner wall of the ball joint cover 42.

Although the vibration damping arrangement has been disclosed in connection with the inboard or chassis side ball joint, it is within the scope of the present invention to provide the same at the outboard ball joint and/or on both if so desired. Simply by way of example the ball seat 13 shown in FIG. 8 can be constructed to attenuate the transmission of the above mentioned reverberation noise generating type vibrations. As a further example, it is possible to arrange for an elastomeric grommet having suitably projections and/or recesses to be fitted about the synthetic resin connector 15 illustrated in FIG. 1, and use the grommet to attenuate the transmission of reverberation noise inducing vibrations from the power unit 2 to the vehicle chassis through the roll damper unit.

What is claimed is:
1. A vibration damper comprising:
    a housing including a chamber filled with a viscous fluid, said housing being connected to a first structure;
    a disc disposed in said chamber and immersed in said viscous liquid and movable relative to said housing;
    a rigid link extending between said housing and a second structure;
    a first universal joint connecting a first end of said link to said second structure;
    a second universal joint operatively interconnecting a second end of said link with said housing; and
    vibration insulation means associated with one of said first and second universal joints for attenuating vibration which tends to be transmitted between the first and second structures without inducing relative movement between said disc and said housing.
2. A vibration damper as claimed in claim 1 wherein said first universal joint comprises:
    a first ball provided on said first end of said link;
    a first ball seat in which said first ball is receivable, said first ball seat comprising a resilient body which exhibits a first spring constant in response to vibrations which induce distortion of the resilient body within a first predetermined range, and a second spring constant which is higher than the first spring constant in response to vibrations which cause distortion of the resilient body in a second predetermined range, said vibration insulation means comprising said resilient body; and
    a casing in which said resilient body is disposed and which is connected to said second structure, said casing cooperating with said resilient body to define the maximum amount of distortion which can be induced in said resilient body.
3. A vibration damper as claimed in claim 2 wherein said resilient body exhibits a third spring constant which is higher than said second spring constant and which is induced in response to vibration which causes distortion greater than said second predetermined range and which proximates a maximum permissable amount of distortion.
4. A vibration damper as claimed in claim 1 wherein said second universal joint comprises:
    a second ball provided on said second end of said link; and
    a second ball seat in which said second ball is receivable, said second ball seat comprising a resilient body disposed in a cavity defined in said housing and exhibiting a first spring constant in response to vibrations which induce distortion of the resilient body within a first predetermined range, and a second spring constant higher than the first spring constant in response to vibrations which cause distortion of the resilient body in a second predetermined range, wherein said vibration insulation means comprises said resilient body.
5. A vibration damper as claimed in claim 4 wherein said resilient body exhibits a third spring constant which is higher than said second spring constant and which is induced in response to vibration which causes distortion greater than said second predetermined range and which proximates a maximum permissible amount of distortion.

6. A vibration damper as claimed in claim 4 further comprising a connector connected to said second structure, wherein said first universal joint comprises:
   a first ball provided on said first end of said link; and
   a first ball seat in which said first ball seat is receivable, said first ball seat comprising a shaped recess formed in said connector.

7. A vibration damper as claimed in claim 6 wherein said connector comprises a stepped member formed with a slit which permits said stepped member to exhibit sufficient flexibility to have said second ball inserted into said shaped recess, said stepped member being connected to a mounting bracket in a manner which prevents the stepped member from flexing and prevents the removal of said first ball from said shaped recess.

8. A vibration damper as claimed in claim 1 wherein said disc is formed with a plurality of arcuate ribs, and wherein said housing is formed with a plurality of annular corrugations which cooperate with said arcuate ribs.

9. A vibration damper as claimed in claim 1 wherein said first and second universal joints comprise first and second balls respectively, said first and second balls being rigidly connected with said link.

10. A vibration damper as claimed in claim 9, wherein one of said first and second balls is detachably connected to said link.

11. A vibration damper as claimed in claim 1 wherein said universal joints comprise first and second balls respectively, said first and second balls being rotatably mounted on said link.

12. A vibration damper as claimed in claim 1 wherein at least one of said universal joints comprises:
   a ball;
   a recess in which said ball is housed; and
   an elastomeric ball seat disposed inside said recess and having a spherical inner surface that contacts said ball and an outer surface having a portion attached to said recess and a portion that contacts said recess only when said ball seat is distorted, wherein said vibration insulation means comprises said elastomeric ball seat.

13. A vibration damper as claimed in claim 1 wherein at least one of said universal joints comprises:
   a ball;
   a recess in which said ball is housed; and
   an elastomeric ball seat disposed inside said recess and having a spherical inner surface having a plurality of projections that contact said ball when said ball seat is not distorted and portions that can contact said ball only when said ball seat is distorted, wherein said vibration insulation means comprises said elastomeric ball seat.

14. A vibration damper for damping rolling of an engine comprising:
   a housing having a chamber filled with a viscous fluid;
   a disc disposed in the chamber and rotatably supported by said housing and secured to said engine;
   a rigid link having first and second ends; and
   a first universal joint connecting the first end of the link to the housing at a location spaced from the center of rotation of the disc and a second universal joint connecting the second end of the link to a support, at least one of the universal joints comprising a damping member having a spring constant that increases with the magnitude of vibrations imparted to the damping member.

* * * * *